(12) United States Patent
Holloway

(10) Patent No.: US 9,090,342 B2
(45) Date of Patent: Jul. 28, 2015

(54) ROCKING BOGIE MECHANISM

(71) Applicant: Goodrich Corporation, Charlotte, NC (US)

(72) Inventor: Gary Holloway, Ontario (CA)

(73) Assignee: GOODRICH CORPORATION, Charlotte, NC (US)

(*) Notice: Subject to any disclaimer, the term of this patent is extended or adjusted under 35 U.S.C. 154(b) by 90 days.

(21) Appl. No.: 14/046,626

(22) Filed: Oct. 4, 2013

(65) Prior Publication Data

US 2015/0097080 A1  Apr. 9, 2015

(51) Int. Cl.
*B64C 25/22* (2006.01)
*B64C 25/34* (2006.01)

(52) U.S. Cl.
CPC ............... *B64C 25/22* (2013.01); *B64C 25/34* (2013.01); *B64C 2025/345* (2013.01)

(58) Field of Classification Search
CPC .... B64C 25/34; B64C 2025/345; B64C 25/22
See application file for complete search history.

(56) References Cited

U.S. PATENT DOCUMENTS

| | | | | |
|---|---|---|---|---|
| 4,345,727 A * | 8/1982 | Brown et al. | ............ | 244/102 R |
| 5,086,995 A * | 2/1992 | Large | ........................ | 244/102 R |
| 6,131,852 A * | 10/2000 | Holloway | ................. | 244/102 R |
| 8,448,900 B2 * | 5/2013 | Mellor et al. | ............. | 244/102 A |
| 2005/0011991 A1 * | 1/2005 | Ducos et al. | ............. | 244/102 R |
| 2013/0341459 A1 * | 12/2013 | Kosheleff | ....................... | 244/36 |

* cited by examiner

*Primary Examiner* — Valentina Xavier
(74) *Attorney, Agent, or Firm* — Snell & Wilmer, LLP

(57) ABSTRACT

A rocking bogie mechanism may include an upper link, a lower link, a central link, a forward link, an articulation actuator, a trimmer, and a bell crank. The upper link may be coupled to a cylinder at a first joint. The lower link and trimmer may be coupled to the piston at second joint. The upper link, lower link, and central link may be coupled at a third joint. The articulation actuator may be coupled to the upper link at a fourth joint. The trimmer and bell crank may be coupled at a fifth joint. The central link and bell crank may be coupled at a sixth joint. The articulation actuator and bell crank may be coupled at a seventh joint. The central link and forward link may be coupled at an eighth joint. The forward link may be coupled to a bogie beam at a ninth joint.

15 Claims, 4 Drawing Sheets

ROCKING BOGIE MECHANISM

FIELD

The present disclosure relates to landing gear, and more particularly, to systems and methods for maintaining bogie angle positions.

BACKGROUND

Landing gear supports an aircraft while on the ground. Bogie type landing gear may include a bogie beam which supports one or more pairs of wheels. The bogie beam may pivot relative to the landing gear. This may allow certain wheel pairs to touch ground prior to other wheel pairs during landing, and may allow all or a portion of all the wheels to remain on the ground as an aircraft body's center line changes angles with respect to the ground, for example, during takeoff or landing.

Some mechanisms may prevent free rotation of the bogie beam during landing. These systems may transfer load from the bogie beam to a landing gear cylinder, which may require additional weight to be added to the cylinder to prevent the cylinder from pinching against a piston and to prevent the piston from compressing within the cylinder.

SUMMARY

A rocking bogie mechanism may include an upper link, a lower link, a central link, an articulation actuator, a trimmer, a bell crank, and a forward link. The upper link may be coupled to a cylinder at a first joint. The lower link may be coupled to a piston at a second joint and coupled to the upper link at a third joint. The central link may be coupled to the upper link and the lower link at the third joint. The articulation actuator may be coupled to the upper link at a fourth joint. The trimmer may be coupled to the piston at the second joint. The bell crank may be coupled to the trimmer at a fifth joint, coupled to the central link at a sixth joint, and coupled to the articulation actuator at a seventh joint. The forward link may be coupled to the central link at an eighth joint and coupled to a bogie beam at a ninth joint. The articulation actuator and the trimmer may be powered to retract.

An aircraft landing gear may comprise a cylinder, a piston, an upper link, a lower link, a central link, an articulation actuator, a trimmer, a bell crank, and a forward link. The piston may be configured to telescopically move within the cylinder. The upper link may be pivotably coupled to the cylinder at a first joint. The lower link may be pivotably coupled to the piston at a second joint and pivotably coupled to the upper link at a third joint. The central link may be pivotably coupled to the upper link and the lower link at the third joint. The articulation actuator may be pivotably coupled to the upper link at a fourth joint. The trimmer may be pivotably coupled to the piston at the second joint. The bell crank may be pivotably coupled to the trimmer at a fifth joint, pivotably coupled to the central link at a sixth joint, and pivotably coupled to the articulation actuator at a seventh joint. The forward link may be pivotably coupled to the central link at an eighth joint and pivotably coupled to a bogie beam at a ninth joint.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for maintaining an angular position of a bogie beam are disclosed. A bogie-type landing gear may comprise a bogie beam. Two or more pairs of wheels may be mounted on the bogie beam. The bogie beam may be pivotably coupled to a piston of the landing gear. It may be desirable to prevent free rotation of the bogie beam. A rocking bogie mechanism may prevent the bogie beam from initially rotating in response to the aft wheels making contact with the ground. This may allow the landing gear to partially compress prior to all wheels contacting the ground, in effect lengthening the landing gear. Additionally, the rocking bogie mechanism may position the bogie beam in a desired position for landing gear retraction.

Figure 1:
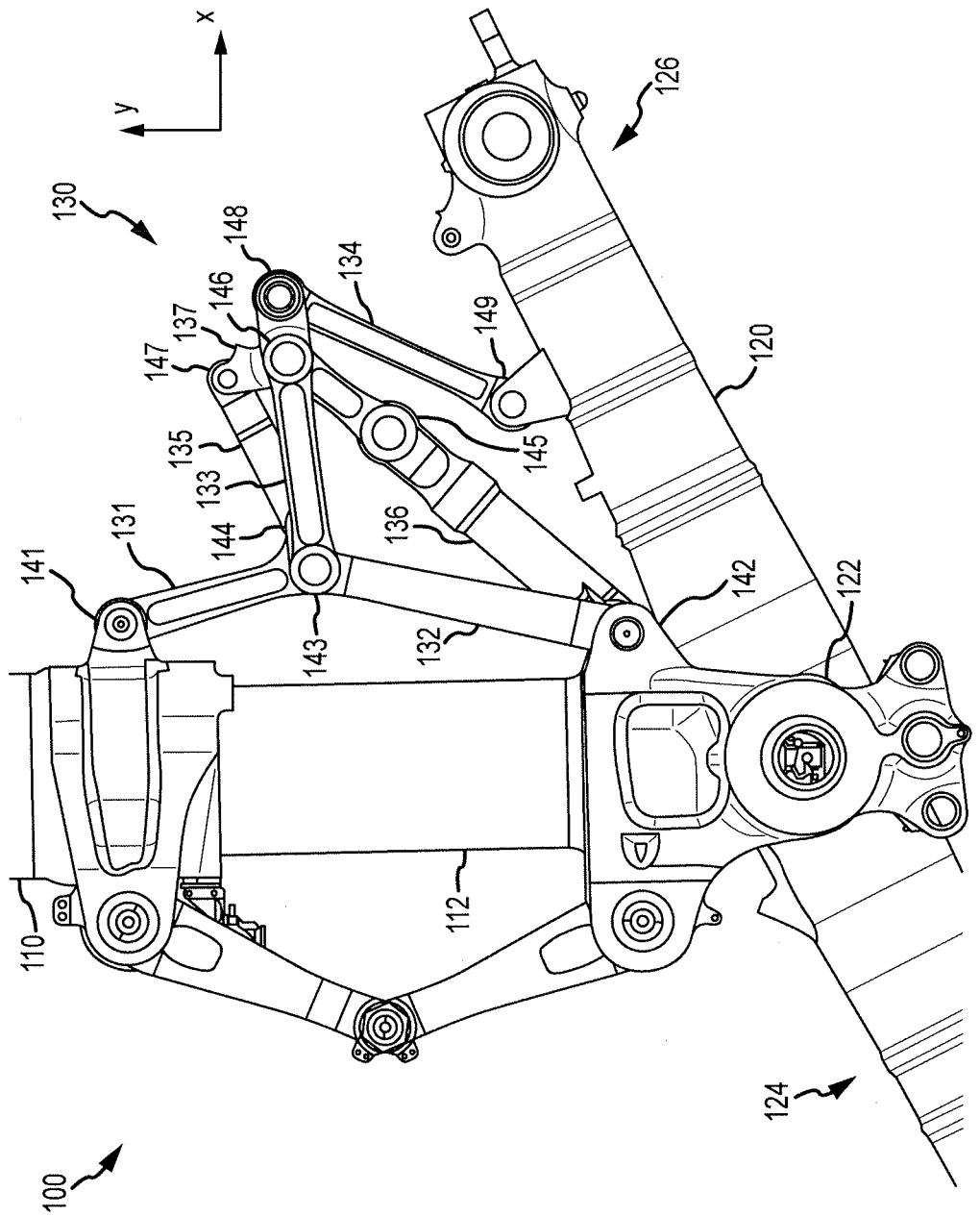
FIG. 1 illustrates, in accordance with various embodiments, a portion of a bogie-type landing gear in an approach position.

Referring to FIG. 1, a portion of a landing gear 100 is illustrated in an approach position according to various embodiments. Landing gear 100 may comprise cylinder 110, piston 112, bogie beam 120, and rocking bogie mechanism 130. Piston 112 may be configured to telescopically move within cylinder 110. Bogie beam 120 may be configured to pivot relative to piston 112 at pivot 122.

Rocking bogie mechanism 130 may comprise upper link 131, lower link 132, central link 133, forward link 134, articulation actuator 135, trimmer 136, and bell crank 137. Upper link 131 may be pivotably coupled to cylinder 110 at first joint 141. Lower link 132 and trimmer 136 may be pivotably coupled to piston 112 at second joint 142. Upper link 131, lower link 132, and central link 133 may be pivotably coupled at third joint 143. Articulation actuator 135 may be pivotably coupled to upper link 131 at fourth joint 144. Trimmer 136 and bell crank 137 may be pivotably coupled at fifth joint 145. Central link 133 and bell crank 137 may be pivotably coupled at sixth joint 146. Articulation actuator 135 and bell crank 137 may be pivotably coupled at seventh joint 147. Central link 133 and forward link 134 may be pivotably coupled at eighth joint 148. Sixth joint 146 may be located between third joint 143 and eighth joint 148. Forward link 134 may be pivotably coupled to bogie beam 120 at ninth joint 149.

As further described herein, articulation actuator 135 and trimmer 136 may be configured to extend or compress. For example, articulation actuator 135 and trimmer 136 may comprise internal hydraulic or electric systems which may be powered to retract or extend articulation actuator 135 and trimmer 136. As illustrated in FIG. 1, both articulation actuator 135 and trimmer 136 are in the fully compressed position. Thus, articulation actuator 135 and trimmer 136 will not further compress in response to any compression forces. Upper link 131, lower link 132, central link 133, forward link 134, and bell crank 137 may be rigid components which do not compress, extend, or bend. Upper link 131, lower link 132, central link 133, forward link 134, and bell crank 137 may comprise any suitable material, such as titanium, aluminum, or steel.

As an aircraft approaches a runway for landing, bogie beam 120 may be in a nose up position as illustrated, wherein aft wheels coupled to aft end 124 of bogie beam 120 are located closer to the runway than forward wheels coupled to forward end 126 of bogie beam 120. Thus, the aft wheels coupled to aft end 124 of bogie beam 120 may contact the runway while central wheels coupled to pivot 122 and the forward wheels coupled to forward end 126 of bogie beam 120 remain in the air due to the angle of bogie beam 120. The contact at the aft wheels may result in a torque on bogie beam 120 in the clockwise direction about pivot 122. However, rocking bogie mechanism 130 may initially prevent rotation of bogie beam 120 about pivot 122.

The torque may cause forward end 126 of bogie beam 120 to exert a force in the negative y-direction on forward link 134. Forward link 134, in turn, exerts a force on central link 133 at eighth joint 148 in the direction of ninth joint 149, resulting in a torque on central link 133 about third joint 143 in a clockwise direction. However, bell crank 137, articulation actuator 135, and trimmer 136 prevent central link 133 from rotating about third joint 143. Trimmer 136 is fully compressed, thus bell crank 137 may not compress trimmer 136 further to allow central link 133 to rotate. Additionally, in order for bell crank 137 to rotate about sixth joint 146 in the illustrated position, either articulation actuator 135 or trimmer 136 may extend. However, both articulation actuator 135 and trimmer 136 may be powered to retract, thus bell crank 137 may be prevented from rotating about sixth joint. The torque on central link 133 at eighth joint 148 from forward link 134 in the clockwise direction is therefore counteracted by a torque on central link 133 at sixth joint 146 in the counter-clockwise direction from bell crank 137 and trimmer 136. The force on central link 133 may thus be transferred back to piston 112 at second joint 142.

Figure 2:
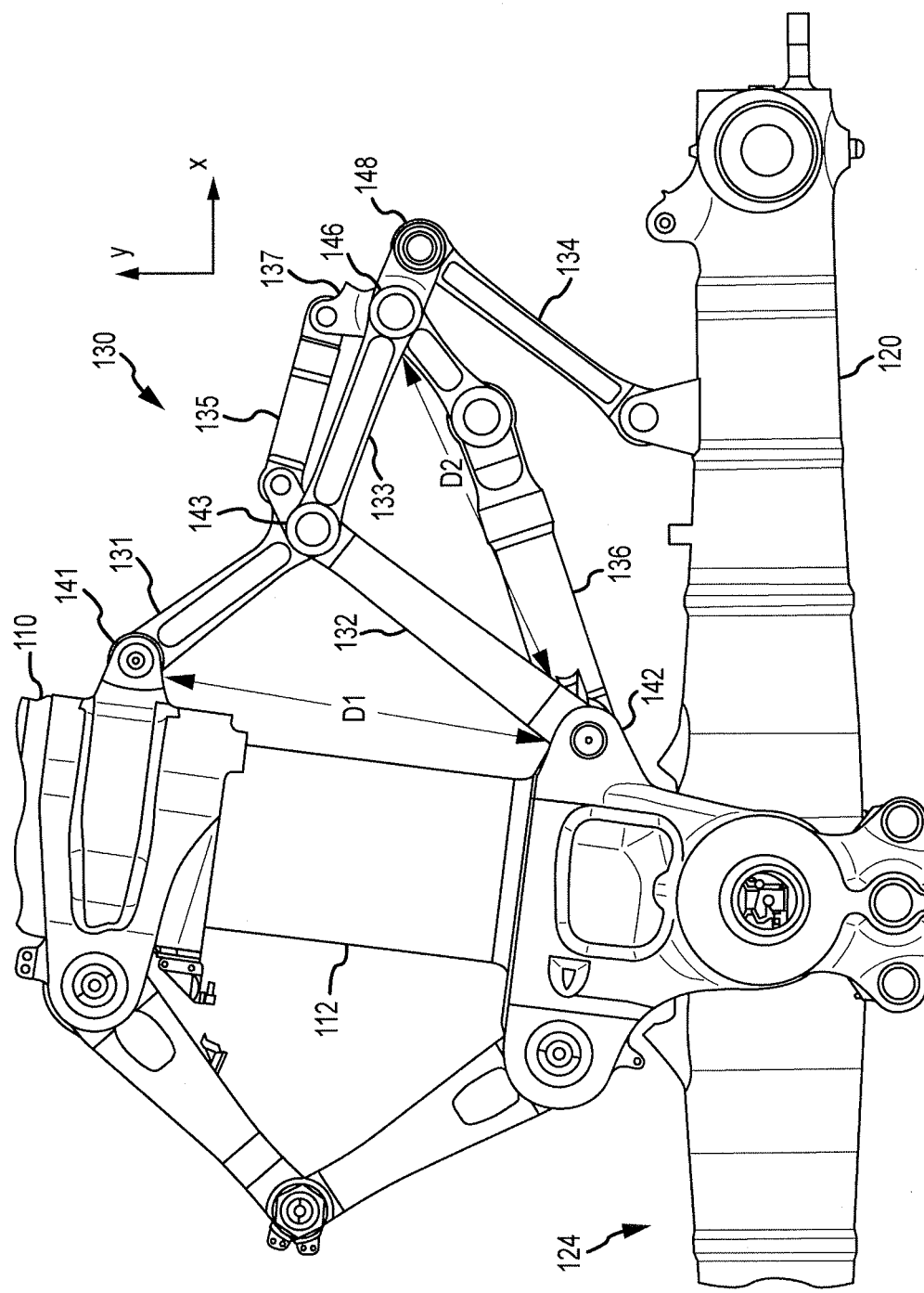
FIG. 2 illustrates, in accordance with various embodiments, a portion of a bogie-type landing gear at touchdown.

Referring to FIG. 2, although rocking bogie mechanism 130 may prevent bogie beam 120 from rotating initially, piston 112 may telescopically move into cylinder 110 to absorb the force from the aft wheels coupled to aft end 124 of bogie beam 120. As piston 112 compresses into cylinder 110, a distance D1 between first joint 141 and second joint 142 decreases, causing upper link 131 to rotate in the counter-clockwise direction about first joint 141, and lower link 132 to rotate in the clockwise direction about second joint 142. This in turn causes third joint 143 to move in the positive x-direction.

Upper link 131 may be shorter than lower link 132. Therefore, third joint 143 must also move in the positive y-direction as it moves in the positive x-direction as upper link 131 rotates about first joint 141. As piston 112 compresses into cylinder 110, a distance D2 between second joint 142 and sixth joint 146 also decreases. Thus, trimmer 136 must rotate about second joint 142. Articulation actuator 135 may be powered to retract, thus articulation actuator 135 prevents bell crank 137 from rotating in the clockwise direction. Thus, trimmer 136 rotates in the clockwise direction about second joint 142, causing bell crank 137 to rotate in the counter-clockwise direction about sixth joint 146. In response to trimmer 136 rotating in the clockwise direction, trimmer 136 and bell crank 137 are not capable of applying a torque on central link 133 at sixth joint 146 about third joint 143 sufficient to counteract the torque applied by forward link 134 on central link 133 at eighth joint 148 about third joint 143. Thus, in response to piston 112 compressing into cylinder 110, bogie beam 120 may rotate in the clockwise direction about pivot 122 until all wheels are on the ground and bogie beam 120 is parallel to the ground.

Figure 3:
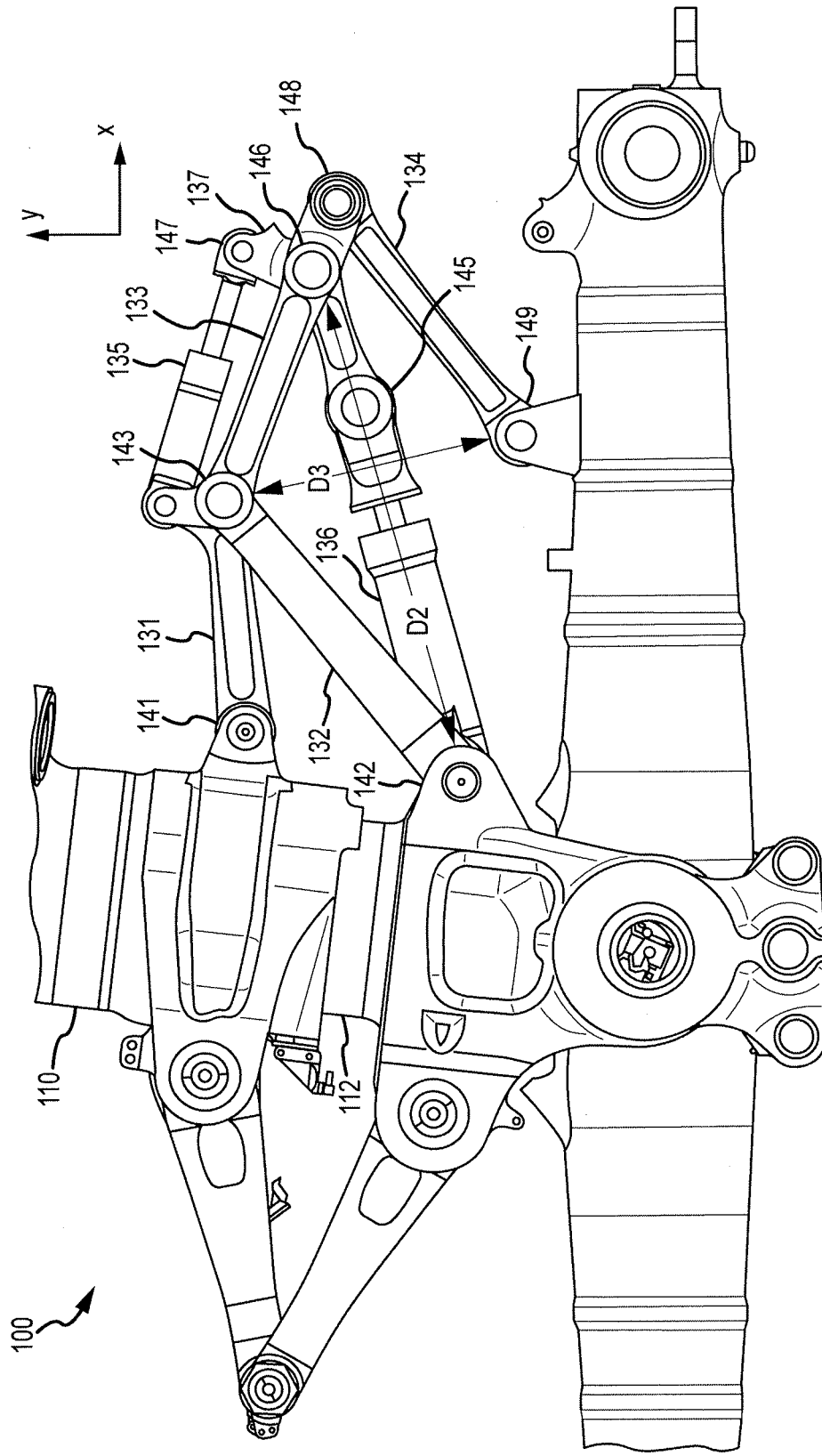
FIG. 3 illustrates, in accordance with various embodiments, a portion of a bogie-type landing gear in a compressed position.

Referring to FIG. 3, as the weight of the aircraft on landing gear 100 increases, piston 112 may continue to compress into cylinder 110. This may cause third joint 143 to move further in the positive x-direction and positive y-direction as upper link 131 rotates in the counter-clockwise direction about first joint 141. Additionally, as piston 112 compresses further into cylinder 110, lower link 132 continues to rotate in the clockwise direction. Thus, a distance D3 between third joint 143 and ninth joint 149 decreases. This causes central link 133 to rotate in the counter-clockwise direction about third joint 143, and causes forward link 134 to rotate in the clockwise direction about ninth joint 149, resulting in sixth joint 146 and eighth joint 148 moving in the positive x-direction.

At this point, bell crank 137 may exert an extension force on trimmer 136 in the direction of fifth joint 145 which exceeds the powered retraction force on trimmer 136. Thus, trimmer 136 may be forced to extend, allowing the distance D2 between second joint 142 and sixth joint 146 to increase. Additionally, at this point the force on articulation actuator 135 applied by bell crank 137 in the direction of seventh joint 147 may be greater than the powered retraction force on articulation actuator 135, causing articulation actuator 135 to extend. In various embodiments, trimmer 136 and articulation actuator 135 may act as dampers to damp movement of bogie beam 120 when the wheels are on the ground.

Figure 4:
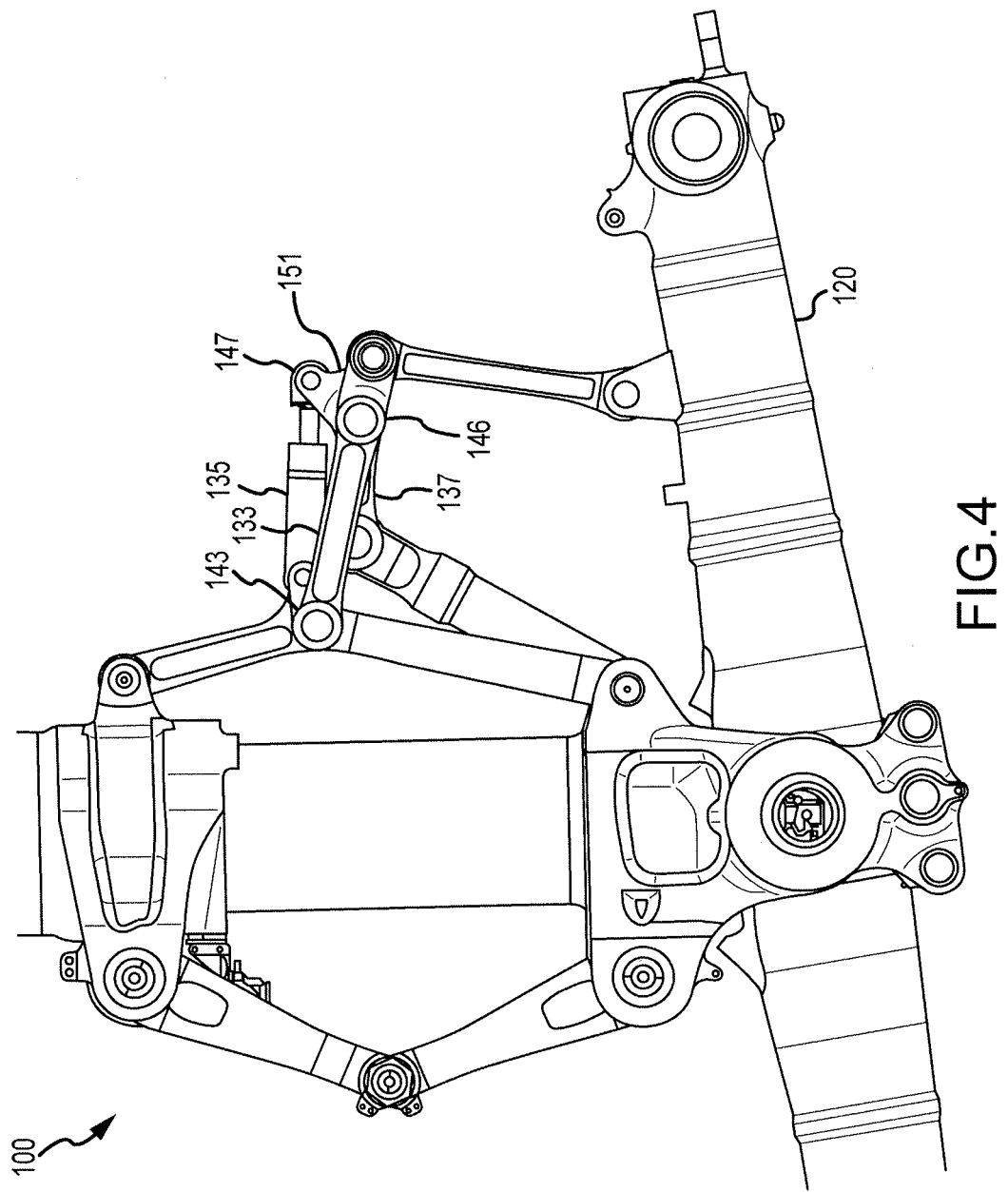
FIG. 4 illustrates, in accordance with various embodiments, a portion of a bogie-type landing gear in a retraction position.

Referring to FIG. 4, landing gear 100 is illustrated in a retraction position. In various embodiments, bogie beam 120 may be required to be at a specified angle in order for landing gear 100 to retract correctly, such as 1.5° with respect to the aircraft body, or between 1.3°-1.7° with respect to the aircraft body. Articulation actuator 135 may be powered to extend. Thus articulation actuator 135 may provide a torque on bell crank 137 at seventh joint 147 in the clockwise direction about sixth joint 146. This may cause bell crank 137 to rotate in the clockwise direction until a bell crank stop 151 contacts central link 133.

In this position, piston 112 and cylinder 110 are in a fixed position with respect to each other. Thus, third joint 143 is also fixed relative to piston 112 and cylinder 110. In order for bogie beam 120 to rotate in the counter-clockwise direction, central link 133 may rotate in the counter-clockwise direction about third joint 143, and articulation actuator 135 may compress. However, the powered extension of articulation actuator 135 prevents compression of articulation actuator 135, thus preventing counter-clockwise rotation of bogie beam 120. In order for bogie beam 120 to rotate in the clockwise direction, central link 133 would be required to rotate in the clockwise direction about third joint 143, and bell crank 137 would also be required to rotate in the clockwise direction about sixth joint 146. However, bell crank stop 151 may contact central link 133, preventing further rotation of bell crank 137 in the clockwise direction about sixth joint 146, thus preventing clockwise rotation of bogie beam 120. Therefore, in response to powered extension of articulation actuator 135, bogie beam 120 may be rotated to a fixed position suitable for retraction of landing gear 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rocking bogie mechanism comprising:
   an upper link coupled to a cylinder at a first joint;
   a lower link coupled to a piston at a second joint and to the upper link at a third joint;
   a central link coupled to the upper link and the lower link at the third joint;
   an articulation actuator coupled to the upper link at a fourth joint;
   a trimmer coupled to the piston at the second joint;
   a bell crank coupled to the trimmer at a fifth joint, coupled to the central link at a sixth joint, and coupled to the articulation actuator at a seventh joint; and
   a forward link coupled to the central link at an eighth joint and coupled to a bogie beam at a ninth joint.

2. The rocking bogie mechanism of claim 1, wherein the upper link is shorter than the lower link.

3. The rocking bogie mechanism of claim 1, wherein the rocking bogie mechanism is configured to prevent rotation of the bogie beam in response to the piston being fully extended with respect to the cylinder.

4. The rocking bogie mechanism of claim 1, wherein the articulation actuator and the trimmer are powered to retract.

5. The rocking bogie mechanism of claim 1, wherein the sixth joint is located between the third joint and the eighth joint.

6. The rocking bogie mechanism of claim 1, wherein the bell crank comprises a bell crank stop.

7. The rocking bogie mechanism of claim 6, wherein the articulation actuator is configured to extend.

8. The rocking bogie mechanism of claim 7, wherein in response to extension of the articulation actuator, the bell crank stop contacts the central link.

9. An aircraft landing gear comprising:
   a cylinder;
   a piston configured to telescopically move within the cylinder;
   an upper link pivotably coupled to the cylinder at a first joint;
   a lower link pivotably coupled to the piston at a second joint and pivotably coupled to the upper link at a third joint;
   a central link pivotably coupled to the upper link and the lower link at the third joint;
   an articulation actuator pivotably coupled to the upper link at a fourth joint;
   a trimmer pivotably coupled to the piston at the second joint;
   a bell crank pivotably coupled to the trimmer at a fifth joint, pivotably coupled to the central link at a sixth joint, and pivotably coupled to the articulation actuator at a seventh joint; and
   a forward link pivotably coupled to the central link at an eighth joint and pivotably coupled to a bogie beam at a ninth joint.

10. The aircraft landing gear of claim 9, wherein the trimmer and the bell crank are configured to apply a torque on the central link at the sixth joint which prevents rotation of the bogie beam.

11. The aircraft landing gear of claim 10, wherein in response to compression of the piston within the cylinder, the torque on the central link caused by the trimmer and the bell crank decreases.

12. The aircraft landing gear of claim 10, wherein the bell crank comprises a bell crank stop configured to contact the central link.

13. The aircraft landing gear of claim 12, wherein the bell crank stop is configured to maintain the bogie beam in a fixed position.

14. The aircraft landing gear of claim 9, wherein the upper link, the lower link, the central link, the forward link, and the bell crank are rigid.

15. The aircraft landing gear of claim 9, wherein the articulation actuator and the trimmer are powered to retract.

\* \* \* \* \*